United States Patent [19]

Setoguchi et al.

[11] Patent Number: 4,748,643
[45] Date of Patent: May 31, 1988

[54] START BIT DETECTING CIRCUIT

[75] Inventors: Kaoru Setoguchi, Chofu; Hiroki Hosoi, Tokyo; Teruyuki Kubo; Masaji Muranaka, both of Yokohama, all of Japan

[73] Assignee: Iwatsu Electric Co., Ltd., Tokyo, Japan

[21] Appl. No.: 25,474

[22] Filed: Mar. 13, 1987

[30] Foreign Application Priority Data

Mar. 19, 1986 [JP] Japan ................... 61-59583

[51] Int. Cl.⁴ .......................................... H04L 25/38
[52] U.S. Cl. ...................................... 375/117; 370/48
[58] Field of Search ............... 375/76, 114, 116, 117; 370/48, 100, 102; 307/358, 359

[56] References Cited

U.S. PATENT DOCUMENTS

| | | | |
|---|---|---|---|
| 3,396,239 | 8/1968 | Yamauchi | 370/48 |
| 3,749,840 | 7/1973 | Fornasiero et al. | 370/48 |
| 4,048,440 | 9/1977 | Peck et al. | 370/48 |
| 4,318,128 | 3/1982 | Sauvanet | 307/359 |
| 4,387,465 | 6/1983 | Bocker | 375/76 |
| 4,540,897 | 9/1985 | Takaoka | 375/76 |
| 4,598,268 | 7/1986 | Perry | 375/76 |

*Primary Examiner*—Robert L. Griffin
*Assistant Examiner*—Stephen Chin
*Attorney, Agent, or Firm*—Emmanuel J. Lobato; Robert E. Burns

[57] ABSTRACT

A start bit detecting circuit is disclosed, which employs a waveform reshaper, a detection and start circuit and a decision circuit. The waveform reshaper has threshold values T+ and T−. The detection and start circuit starts the start bit detecting circuit upon detection of a predetermined pulse width. The decision circuit judges, for a plurality of decision points, coincidence between the input signal and a specific pattern having a start-signal element, which comprises a plurality of bits.

1 Claim, 3 Drawing Sheets

START BIT DETECTING CIRCUIT

BACKGROUND OF THE INVENTION

The present invention relates to a start bit detecting circuit which performs accurate detection of a start bit for ensuring reliable data regenerating in a receiving circuit of a bidirectional-current, start-stop synchronization type digital signal.

In a start-stop synchronization type digital communication system, it is very important to correctly detect each start bit to stably maintain the start-stop synchronization. However, there have not yet been proposed a start bit detecting circuit, by which each start bit can be correctly and stably detected.

SUMMARY OF THE INVENTION

An object of the present invention is to provide a start bit detecting circuit which markedly alleviates malfunctions of erroneously detecting, as a start bit, noise superimposed on the transmission line in the absence of a signal to allow the generation of invalid data and leaving undetected a normal start bit and data which are input during the generation of the invalid data.

According to an aspect of the present invention, the start bit detecting circuit of the present invention employs a waveform reshaper which has threshold values T+ and T−, a detection and start circuit which starts the start bit detecting circuit upon detection of a predetermined pulse width, and a decision circuit for deciding, for a plurality of decision points, coincidence between the input signal and a specific pattern having a start-signal element, which comprises a plurality of bits. The start bit detector ignores noise of a value in the range of the threshold values T+ to T− of the waveform reshaper. With respect to noise exceeding the above range, if it is smaller than the predetermined pulse width, the detection and start circuit does not start the start bit detector. Furthermore, noise greater than the predetermined pulse width is dealt with by using the start bit in the form of a specific pattern composed of a plurality of bits and detecting coincidence between the input signal and the pattern at many decision points. Thus, the malfunction of detecting noise as a start bit can be minimized.

According to another aspect of the present invention, in order not to deteriorate the detection of a normal start bit immediately after noise, the input signal is decided to be noise at an instant when noncoincidence between the input signal and the pattern is detected at one or more detection points, and the start bit detecting circuit is immediately reset, rapidly making it possible to detect the next start bit.

According to another aspect of the present invention, provision is made for eliminating the possibility that noise superimposed on the normal start bit is left undetected if the start bit is decided to be the input signal by the coincidence at all the points when the decision of the start bit is made by the coincidence at a plurality of decision points. To this end, the decision of the start bit is made on the basis of the coincidence detected at some of a predetermined number of decision points, thereby improving what is called an undetected error rate.

Yet another aspect of the present invention, in order to overcome such a defect that when the leading edge of the start bit on which data regeneration clocks are based is fluctuated by the superimposition of noise on the start bit, the entire reproduced data becomes erroneous, the start bit is formed by a plurality of bits so that it rises and falls at many decision points. A plurality of data regenerating pulses are generated on the basis of such decision points and appropriate clock pulses are selected from them, thereby ensuring the data regeneration.

BRIEF DESCRIPTION OF THE DRAWINGS

The present invention will be described in detail below in comparison with prior art with reference to the accompanying drawings, in which.

DETAILED DESCRIPTION

To make differences between prior art and the present invention clear, an example of prior art will first be described.

Figure 1:
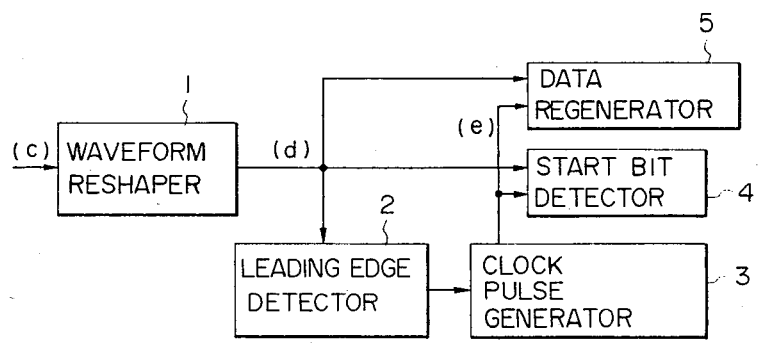
FIG. 1 is a block diagram illustrating an example of a conventional receiving circuit for a unidirectional-current, NRZ start-stop synchronization type digital signal.
Figure 2:
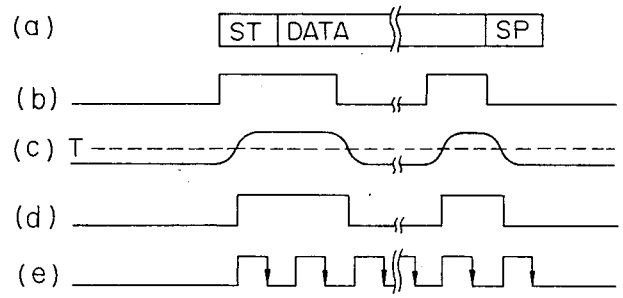
FIGS. 2 and 3 are the signal format of the conventional unidirectional-current, NRZ start-stop synchronization type digital signal and waveforms occurring at respective parts in the circuit of FIG. 1.

FIG. 1 shows, as a prior art example, a receiving circuit for a unidirectional-current, NRZ start-stop synchronization type digital signal and FIG. 2 its signal format and waveforms of respective positions in the circuit. A signal format (a) of FIG. 2 shows ST, DATA, and SP indicating a start bit, data, and a stop bit, respectively. A waveform (b) of FIG. 2 shows its transmitted waveform in a case where ST=1, DATA=1, 0, ... 0, 1, and SP=0. The waveform (b) from the transmitting side is transmitted over a transmission line and is input as a received waveform (c) into the receiving circuit. The received waveform (c) is shaped by a waveform reshaper 1, with a threshold value T, into a received signal (d). Upon detection of the leading edges of the received signal (d) by a leading edge detector 2, a clock pulse generator 3 starts to generate clock pulses (e). Next, the start bit, that is, the first bit of the received signal (d) is checked by a start bit detector 4 at the fall of the corresponding clock pulse (e), and if it is normal (=1), the second and subsequent bits will be reproduced by a data regenerator 5 at the fall of the corresponding clock pulses (e). If the start bit is abnormal (=0), the leading edge detector 2 and the clock pulse generator 3 are reset, starting to detect the start bit, that is, the rise of the received signal (d).

Figure 3:
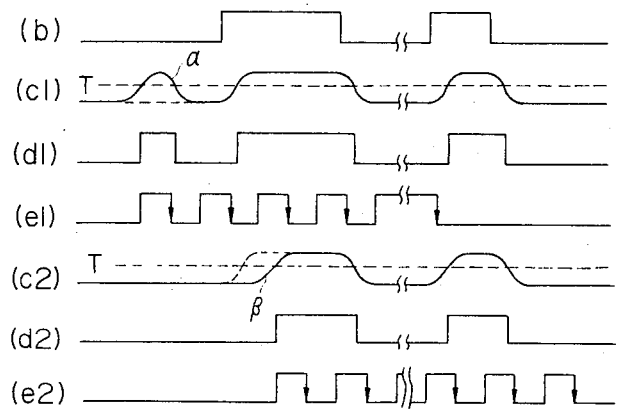

However, when noise is superimposed on the transmission line and the received waveform is distorted, as indicated by "α" in (c1) or "β" in (c2) of FIG. 3, the received signal and the clock pulses assume as depicted in (d1) and (e1) or (d2) and (e2) of FIG. 3, respectively. In consequence, data which ought to be reproduced by the data regenerator 5 into "1, 0, ... 0, 1" are rendered into "0, 1, 1, ... " by (c1), (d1) and (e1) or "0, ... 1, 0" by (c2), (d2) and (e2). Where the start bit is received normally as shown by (c) in FIG. 2, even if noise is superimposed on the data part and an error occurs, error recovery can be achieved to some extent by providing an error correcting code such as CRC in the data part. However, if noise occurs at the absence of a signal as indicated by "α" in (c1) of FIG. 3 and it is erroneously detected as a start bit, the clock pulses are generated, and even if no signal is present on the transmission line, invalid data are generated taking it for granted that a train of signals ST, DATA and SP are present. Furthermore, once the operation starts, the detection of the start bit is ineffective until the reception of a next stop bit SP, so that even if the correct start bit and data are input during the generation of the invalid data as depicted in (c1) of FIG. 3, they are not correctly detected. Moreover, if noise is superimposed on the start bit to fluctuate its rise time, as indicated by "β" in (c2) of FIG. 3, the entire data are erroneously detected because the data are regenerated on the basis of the leading edge of the start bit, and error recovery can not be made even by using CRC or the like.

The present invention will now be described to overcome the above objects of the prior art.

Figure 4:
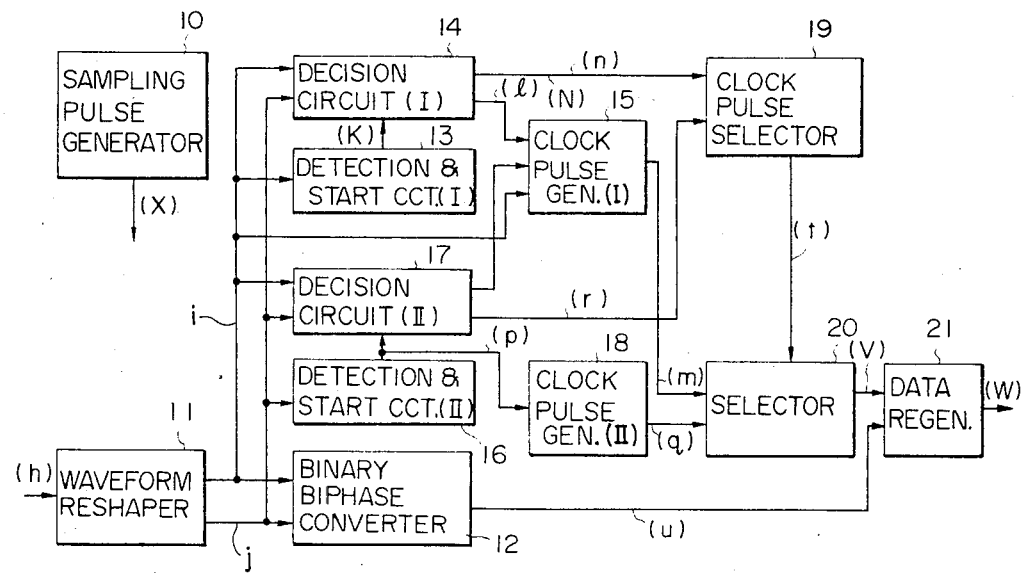
FIG. 4 is a block diagram illustrating an embodiment of the present invention.
Figure 5:
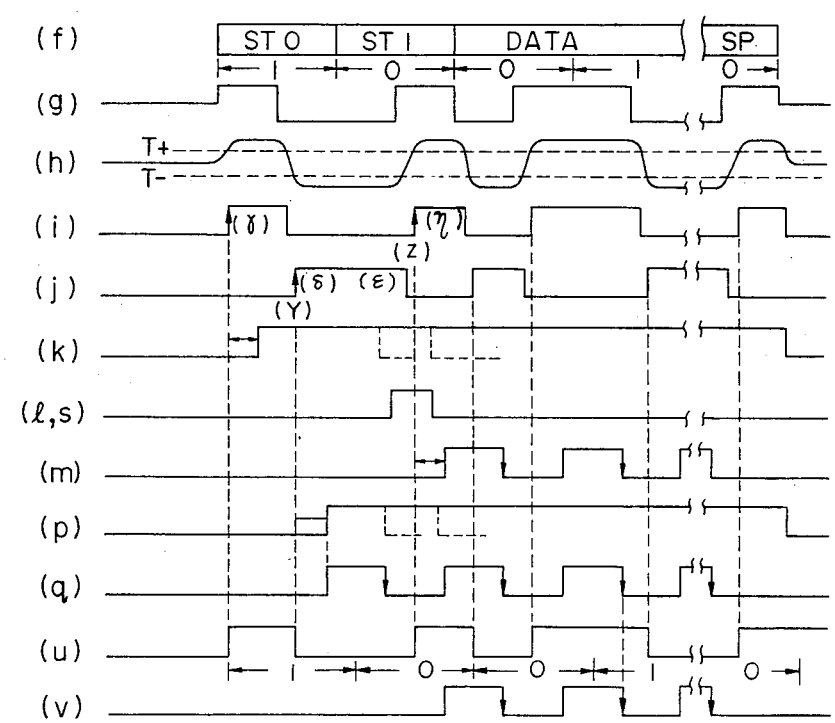
FIG. 5 shows the signal format of the bidirectional-current, bi-phase start-stop synchronization type digital signal to which the present invention is applied, and waveforms occurring at respective parts in the embodiment depicted in FIG. 4.

FIG. 4 is a block diagram of an embodiment of the present invention, illustrating an example of the arrangement of the start bit detector for a bidirectional-current, start-stop synchronization type digital signal. FIG. 5 shows its bidirectional signal format and waveforms occurring at respective parts in the detector. Reference numeral 10 indicates a sampling pulse generator, 11 a waveform reshaper, 12 a binary phase converter, 13 a detection and start circuit (I), 14 a decision circuit (I), 15 a clock pulse generator, 16 a detection and starting circuit, (II), 17 a decision circuit (II), 18 a clock pulse generator, 19 a clock pulse selector, 20 a selector, and 21 a data regenerator.

Next, a description will be given of the operation of this embodiment. A time chart (f) of FIG. 5 is the signal format, ST0 and ST1 indicating start bits, DATA data, and SP a stop bit. A time chart (g) of FIG. 5 is a bidirectional-current, bi-phase, transmitted waveform of split-phase code (Manchester code) which is provided on the transmission line from a transmitting circuit (not shown), showing an example in which ST0=1 (a signal in which the first half of the bit is plus and the latter half is minus. ST1=0 (a signal in which the first half of the bit is minus and the latter half is plus), DATA=0, 1, .. ., and SP=0. The signal (g) is transmitted over the transmission line for input as a received waveform (h) into the start bit detector depicted in FIG. 4. The sampling pulse generator 10 generates sampling clock pulses (x) of a frequency 20-times higher than the signal transmission rate and provides them to respective parts of the start bit detector. The waveform reshaper 11 shapes the received waveform (h) from the transmission line by plus side and minus side threshold values T+ and T−, thereby converting it into plus side and minus side received signals (i) and (j). The binary phase converter 12 is set at the rise of the received signal (i) and reset at the rise of the received signal (j), whereby the signals (i) and (j) are converted into a binary bi-phase received signal (u). The detection and starting circuit (I) 13 samples the received signal (i) by the sampling clock pulses (x). Having detected a state "1" in the received signal (i) ("γ" in FIG. 5) in succession for five clock pulses (x), the detection and starting circuit 13 outputs a first detection start signal (k) and stops its generation after receiving a reset signal (not shown) from the decision circuit (I) 14 or receiving the train of signals ST0 to SP. The end of the signal reception can be decided in the following manner: For example, when the data length is fixed, clock pulses (v) are counted by a predetermined number, or when the data length is indicated in the data, it is read out and the clock pulses (v) are counted after regenerating the data by the data regenerating circuit 21, or the stop bit is formed in a specific pattern, though not shown. Where a state "1" of the signal (i) goes to a state "0" before the generation of the five clock pulses (x), the next state "1" in the received signal (i) is searched. While the first detection start signal (k) assumes the state "1", the decision circuit (I) 14 tests whether the signal (j) is the state "1" or "0" ("δ" and "ε" in FIG. 5), at respective occurrence of 10th and 20th clock pulses (x) from the rise of the signal (k), and tests whether the signal i is the state "1" ("η" in FIG. 5) at the occurrence of a 30th clock pulse (x). When the results of decision are correct at at least two points among three points, the decision circuit 14 provides, at the instant "η", to the clock pulse selector 19 a first coincidence signal (n) and pattern information N representing the results of decision at the three points. However, when the results of decision are not correct at least two decision points among three decision points, the decision circuit 14 immediately resets (not shown) the detection and start circuit (I) 13 and the clock pulse generator (I) 15, and does not output the coincidence signal (n). Further, the decision circuit (I) 14 outputs, for the period of the 20th to 30th clock pulses, a first clock detection window signal l for detecting the leading edge Z of the signal (i) which is used as the reference point of the data regenerating clock. The clock pulse generator (I) 15 monitors the signal (i) while the signal (l) or a signal (s) is the state "1" and upon detection of the leading edge Z of the signal (i), it outputs a first data regenerating pulse (m) which goes high at the occurrence of the fifth clock pulse (x) from the leading edge Z, goes to the state "0" at the occurrence of a 25th clock pulse (x) and thereafter inverts at each 20th clock pulse (x), until after the reception of the reset signal or the end of the signal reception from the decision circuit (I) 14.

The detection and start circuit (II) 16 samples the signal (j) by the clock pulses (x). Having detected the state 1 ("δ" in FIG. 5) in the signal (j) in succession for five clock pulses (x), the detection and start circuit 16 outputs a second detection start output (p) and stops its generation upon a reset output (not shown) or completion of reception of signals from the decision circuit (II) 17.

While the second detection start output (p) is the state "1", the decision circuit (II) 17 tests whether the signal (j) is the state "1" ("ε" in FIG. 5), at the occurrence of the 10th clock pulse (x) from the rise of the output (p), and tests whether the signal (i) is the state "1" ("η" in FIG. 5), at the occurrence of the 20th clock pulse (x). When the results of decision are correct at the both test points, the decision circuit 17 provides a second coincidence signal (r) to the clock pulse selector 19 at the instant "ε". If, however, the results of decision are not correct at either one of the two test points, the decision circuit 17 resets (not shown) the detection and start circuit (II) 16 and the clock pulse generator 18 at that point and does not output the second coincidence signal (r), either. As is the case with the decision circuit (I) 14, the decision circuit (II) 17 outputs a second clock detection window signal (s) for the detection of the rise Z of the signal (i), during the generation of the 10th to 20th clock pulses.

The clock pulse generator 18 generates a second data regenerating clock pulse (q) which assumes the state "1" at the rise of the output (p), assumes the state "0" at the generation of the 20th clock pulse from the rise of the output (p) and thereafter inverts its state at the generation of respective 20th clock pulse (x), until after the reception of the reset signal or the end of the signal reception from the decision circuit (II) 17.

Upon reception of the first or second coincidence signal (n) or (r), the clock pulse selector 19 provides a clock pulse select signal t for selecting the first or second data regenerating clock pulses (m) or (q), on the basis of the pattern information N. The first coincidence signal (n) represents that a point "γ" is correct, the pattern information N represents whether points "δ", "ε" and "η" are correct or not, and the second coincidence signal (r) represents that points "δ", "ε" and "η" are all correct. According to the results of decision for points "γ", "δ", "ε" and "η", the first data regenerating clock pulse (m) based on the rise Z of the signal (i) is output when the "ε" and "η" are correct, and the clock pulse select signal (t) is output by which the second data regenerating clock pulse (q) based on the rise Y of the signal (j) in FIG. 5 is selected when either one of "ε" and "η" is incorrect ("γ" and "δ" are correct in this case).

The selector 20 responds to the select signal (t) to select and output the first or second data reproducing clock pulse (m) or (q) as the data regenerating clock pulse (v). The data regenerating circuit 21 converts the signal (u) into NRZ reproduced data (w) by using the data regenerating clock pulse (v).

Accordingly, the start bit detecting circuit of the present invention performs the following operations for the received waveform with the start bits "1" and "0" in the form of bidirectional-current, bi-phase codes (+, −, −, + in waveform).

(1) The received waveform is shaped by the waveform reshaper 11 with the threshold value T+ and T−, by which it is converted into the signals "i" and "j".

(2) By the detection and start circuit (I) 13 or the detection and start circuit (II) 16, the start bit detection is started upon detection of the pulse width greater than the duration of five clock pulses x. (Ideally, each of the pulses "γ" and "δ" of the signals (i) and (j) has a width corresponding to 10 clock pulses (x).)

(3) When the pulse "γ" is correct in item (2), the decision circuit (I) 14 is started by the detection and start circuit (I) 13, and when it is decided by the decision circuit (I) 14 that at least two of the pulses "δ", "ε" and "η" are correct, the input signal is regarded as the start bit. Where at least two of them are incorrect, the input is regarded as noise, and at that moment the detection and start circuit (I) 13 and the clock pulse generator 15 are reset, after which the next start bit is immediately searched.

In a case where the pulse "γ" is incorrect and the pulse "δ" is correct in item (2), the decision circuit (II) 17 is started, and when it is decided by the decision circuit (II) 17 that the pulses "ε" and "η" are both correct, the input is regarded as the start bit. Moreover, when either one of the two pulses is incorrect, the input is regarded as noise, and the detection and start circuit (II) 16 and the clock pulse generator 18 are immediately reset, after which the next start bit is searched immediately.

That is, when the input is correct at three or more of the four points "γ", "δ", "ε" and "η", it is regarded as the start bit. Conversely, when the input is incorrect at two or more decision points, it is regarded as noise, and the next start bit is immediately searched.

(4) In a case where the input is regarded as the start bit in item (3), an appropriate one of the data reproducing clock pulse based on the rise Z of the signal (i), which is produced by the clock pulse generator (I) 15 and the data regenerating clock pulse based on the rise Y, which is produced by the clock pulse generator (II) 18, is selected by the clock pulse selector 19 for data regeneration.

As described above in detail, the present invention has such merits as follows:

(1) Even if noise is superimposed on the transmission line in the absence of a signal, the circuit of the present invention does not start by the threshold values T+ and T− for noise within the range between the threshold values T+ and T−. For noise greater than the threshold value T+ or smaller than the threshold value T−, the start bit detection is started upon detection of a pulse width greater than five clock pulses (x), and in case of a smaller pulse width, the next start bit is immediately searched. Accordingly, such defects are eliminated that in the absence of signal noise is decided to be a start bit and invalid data is generated and that a normal start bit and data are left undetected even if they are input during the generation of invalid data.

(2) Since the decision of the start bit is based on the coincidence at three or more of four decision points, it is possible to substantially improve the erroneous detection rate of mistaking noise for a start bit and the undetected error rate of mistaking a normal start bit for noise.

The following is the erroneous detection rates and the undetected error rates obtained by the detection and coincidence at one decision point in the prior art example and by the detection at four decision points and coincidence at three or more decision points according to the aforedescribed embodiment of the present invention. Incidentally, the error rate at each detecting point is $1 \times 10^{-k}$, where $1 \gg 1 \times 10^{-k}$.

Prior art example
Erroneous detection rate: $1 \times 10^{-k}$
Undetected error rate: $1 - (1 - 1 \times 10^{-k}) = 1 \times 10^{-k}$
The above embodiment
Erroneous detection rate: $(1 \times 10^{-k})^4 + {}_4C_3 \times (1 \times 10^{-k})^3 \times (1 - 1 \times 10^{-k}) \approx 4 \times 10^{-3k}$
Undetected error rate: $1 - [(1 - 1 \times 10^{-k})^4 + {}_4C_3 \times 1 \times 10^{-k} \times (1 - 1 \times 10^{-k})^3] \approx 12 \times 10^{-2k}$ Further, noise which cannot be prevented in (1) can be mostly prevented. Moreover, since the circuit of the present invention is reset in response to noncoincidence at two of the four decision points and the next start bit is immediately searched, it is possible to minimize the possibility of leaving a normal start bit and data undetected on account of noise immediately preceding them.

(3) Since an appropriate one of the data reproducing clock pulse based on the rise Z and the data reproducing clock pulse based on the rise Y is selected for the data reproduction, the influence of noise on the significant instant of the start bit on which the clock generation is based can be lessened, ensuring accurate data regeneration.

It is apparent that the erroneous detection rate, the undetected error rate, and the accuracy of the data regenerating clock pulses can be modified by changing the number of bits, the code and pattern of the start bit, the threshold values of the waveform shaping circuit, the numbers of detection start circuits, the decision circuits, the clock pulse generators, and the numbers of detection and coincidence of more than three decision points among four decision points.

What we claim is:

1. In a receiving circuit for a digital signal of three-values bidirectional-current, start-stop synchronization having a zero-level at the non-existence of a signal and a (+) side level and a (−) side level at the existence of a signal, a start bit detecting circuit comprising:

a waveform reshaper for converting a received waveform from a transmission line into a binary signal of a (+) side received signal and a (−) side received signal respectively by shaping it with two (+) side and (−) side threshold values for differentiating the non-existence of a signal and the (+) side received signal from the non-existence of a signal and the (−) side received signal;

a detection and start circuit for monitoring the pulse width of the (+) side or (−) side received signal and generating a detection start signal upon detection of a pulse width greater than a predetermined value;

a decision circuit whereby while the detection start signal is generated, the (+) side and (−) side received signals are monitored at a plurality of decision points, when the received signals differ from a predetermined pattern at two or more decision points, a detection stop pulse is applied to the detection start circuit to stop the detection start signal, and when the received signals coincide with the predetermined pattern at two or more decision points, a pattern information signal representing coincidence or noncoincidence at each decision point of the pattern are output together with a coincidence signal;

a plurality of clock pulse generators which detect the rise of the (+) side or (−) side received signal at two or more decision points and generate clock pulses on the basis of each decision point; and a clock pulse selector for selecting one of the plurality of clock pulse generators in accordance with the coincidence signal and the pattern information.

* * * * *